United States Patent Office 3,698,995
Patented Oct. 17, 1972

---

3,698,995
DIGESTION AND BLEACHING OF WOOD PULP FOLLOWED BY RECOVERY OF CHEMICALS AND COUNTERCURRENT FLOW OF WASH WATER
William H. Rapson, Toronto, Ontario, Canada, assignor to Electric Reduction Company of Canada, Ltd.
Continuation of abandoned application Ser. No. 695,159, Jan. 2, 1968. This application Feb. 22, 1971, Ser. No. 117,664
Claims priority, application Great Britain, Jan. 16, 1967, 2,240/67
The portion of the term of the patent subsequent to July 1, 1986, has been disclaimed
Int. Cl. D21c 3/26
U.S. Cl. 162—19     3 Claims

ABSTRACT OF THE DISCLOSURE

Digesting wood in a pulping liquor followed by washing, bleaching, and extracting of the pulp, and concentrating and subjecting the liquor to reducing conditions to recover chemicals, wherein at least part of the wash water obtained from washing bleached cellulosic pulp or from washing bleached and extracted cellulosic pulp is employed to wash unbleached cellulosic pulp thereby providing countercurrent flow of wash water.

---

This application is a continuation of Ser. No. 695,159, filed Jan. 2, 1968, now abandoned.

This invention relates to processes for at least partially reducing the pollution of streams or other bodies of water that has been caused in the past by the discharge into such bodies of water of bleach plant liquors from pulp mills that produce bleached pulp.

Water polluting wastes from bleached pulp mills such as kraft mills or other mills having a chemical recovery system can be reduced in three different ways:

(a) primary treatment of the liquid effluent from the pulp mill by impounding it for long periods of time in large settling areas,
(b) secondary treatment of the liquid effluent from the pulp mill by subjecting the effluent to biological oxidation before it is discharged into a stream or other body of water, and
(c) retention of all insoluble solids within the pulp mill itself.

The first two alternatives naturally are quite expensive, the cost of installing (not including operating costs) primary and secondary effluent treatment systems in an existing large pulp mill having been estimated to be between three and five million dollars.

While it is theoretically possible to wash all soluble materials out of unbleached and bleached pulp, evaporate the wash water and burn the combustible solids, such a process has never to our knowledge been practised, since it has been considered to be totally unfeasible from an economic point of view to evaporate the large volumes of water which are now generally used to remove all the dissolved solids from the unbleached, partially bleached, and bleached pulp. Another reason why such a process has not been utilized is that chlorides would accumulate in the recycled white liquor as a result of the bleaching chemical residues being returned to the pulp mill chemical recovery system.

In a conventional pulp mill employing a CEDED (chlorination, caustic extraction, chlorine dioxide, caustic extraction chlorine dioxide) bleaching system, for example, severe stream pollution may result from the discharge into a stream of the wash water that is used for washing the pulp immediately subsequent to any of the bleaching stages. In accordance with this invention, there is provided a process in which none of this wash water need be discharged into a stream or other body of water.

In its broadest aspect, in accordance with this invention, at least a part of the water which is used to wash the partially bleached pulp subsequent to a first bleaching stage, or at least part of the water which is used to wash the pulp after a first caustic extraction stage also is subsequently used to wash unbleached pulp and then is returned to the pulp mill chemical recovery system.

Figure 1:
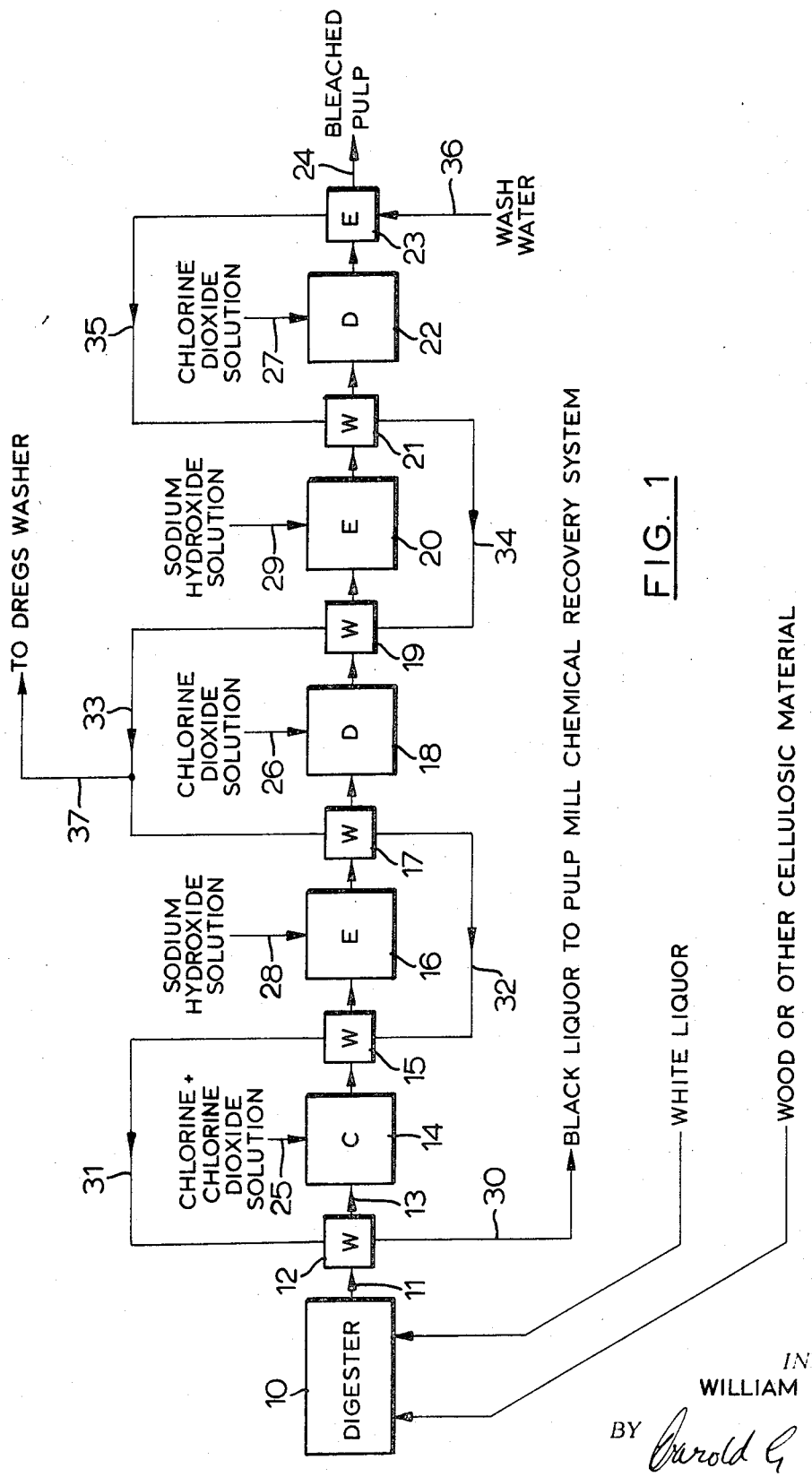
Figure 2:
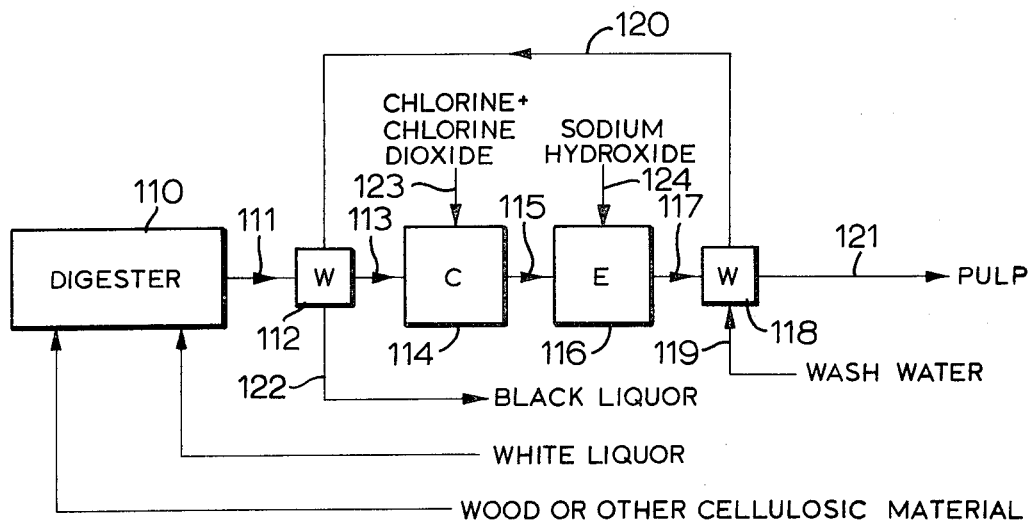
Figure 3:
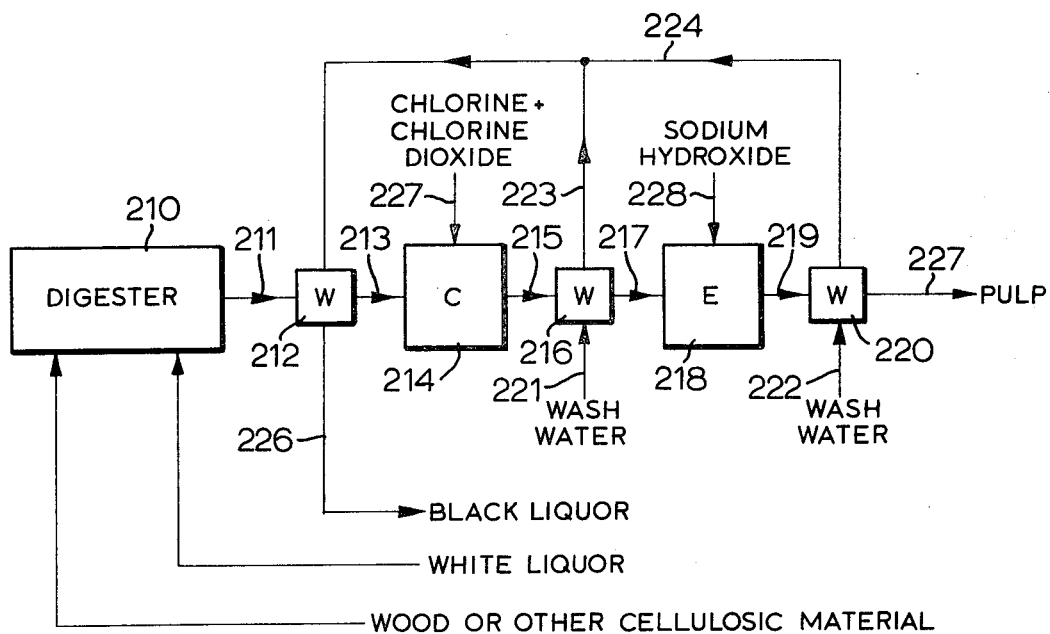

This invention will now be described, by way of example, with reference to the accompanying drawings, in which:

FIG. 1 is a flow sheet in schematic form of a part of a bleached pulp mill embodying the invention;
FIG. 2 is a flow sheet of a modification of FIG. 1; and
FIG. 3 is a flow sheet of a modification of FIG. 2.

With reference to FIG. 1, strictly by way of example only, there is shown a CEDED bleaching system. Unbleached pulp from a digester 10 is supplied via a line 11 to brown stock washers 12 where it is washed. The washed, unbleached pulp from washers 12 is conducted via a line 13 to a first stage bleach tower 14 and then passes in sequence through a washer 15, a first stage caustic extraction tower 16, a washer 17, a second stage bleach tower 18, a washer 19, a second stage caustic extraction tower 20, a washer 21, a third stage bleach tower 22 and a final washer 23, bleached pulp for supply to a paper machine being obtained in a line 24 from final washer 23. Repulpers (not shown) may be used between the various stages as is conventional.

An aqueous solution of chlorine or chlorine dioxide, but preferably an aqueous solution of both chlorine and chlorine dioxide is supplied to bleaching tower 14 via a line 25. Preferably aqueous solutions of chlorine dioxide are supplied via lines 26 and 27 to bleach towers 18 and 22 respectively. Aqueous solutions of sodium hydroxide may be supplied to towers 16 and 20 via lines 28 and 29 respectively.

As has been done in the past, the black liquor from brown stock washers 12 is conducted via a line 30 to the pulp mill chemical recovery system for recovery of chemical and heat values therefrom.

Contrary to what has been done in the past, however, the wash water which is used to wash the at least partially bleached pulp in washer 15 is conducted via a line 31 to brown stock washer 12 and is used to wash the unbleached pulp coming from digester 10. Furthermore, as may be seen by reference to the figure, the wash water for washer 15 is supplied thereto from washer 17 via a line 32, which obtains its supply from washer 19 via a line 33, the latter being supplied with the wash water from washer 21 via a line 34, washer 21, in turn, being supplied with the wash water from final washer 23 via a line 35. Fresh water, evaporator condensate or pulp drying machine white water is furnished to final washer 23 via a line 36. Thus a completely counter current washing system is provided.

If desired, and as shown in the figure, a part of the wash water may be removed via a line 37, which need not be located as shown in the figure, but which could remove a part of the wash water at any suitable point in the washing system, and used to wash the lime mud, dregs or other solids and/or to dissolve the smelt from the furnace of the pulp mill chemical recovery system for example, as set out in Canadian patent application Ser. No. 950,314, filed Jan. 20, 1966 for Process for the Production of Bleached Pulp, the disclosure of which is incorporated herein by reference.

It will be readily apparent from an examination of the figure that there is no liquid effluent from the bleaching system to be discharged into a body of water. All of the liquid effluent eventually is conducted via lines 37, 30 etc., to the pulp mill chemical recovery system where the water is evaporated.

With reference to FIG. 2, the first bleaching and first extraction stages of an overall bleaching and extraction system, e.g., a CEDED system, are illustrated. Unbleached pulp from digester 110 is supplied through line 111 to brown stock washers 112 where it is washed. The washed pulp is passed from the washers 112 through line 113 to a first stage bleach tower 114 and thence through line 115 to a first stage extraction tower 116. The bleached and extracted pulp is next passed through line 117 to washer 118. The pulp is then passed through line 121 for further processing such as further bleaching by the system illustrated in FIG. 1. Repulpers (not shown) may be used between the bleaching and extraction stages as is conventional.

Aqueous bleaching solution, which may be chlorine and is preferably a mixture of chlorine and chlorine dioxide, is supplied to the bleach tower 114 through line 123. An aqueous solution of sodium hydroxide is fed to to the extraction tower 116 through line 124.

The black liquor from the brown stock washers 112 is conducted through line 122 to the pulp mill chemical recovery system for recovery of chemical values therefrom.

Wash water, which may be fresh water, evaporator condensate, pulp drying machine white water, or spent wash water from a subsequent washing step, is supplied to the washer 118 through line 119 and the spent wash water is fed through line 120 to the brown stock washers 112. Thus, this embodiment of the invention differs from the embodiment illustrated in FIG. 1 in that a washer is omitted between the first bleaching stage and the first extraction stage and spent wash water from the washer is fed directly to the brown stock washers.

The embodiment of the invention illustrated in FIG. 3 is similar to that shown in FIG. 2 except that a washer is provided between the first bleaching stage and the first extraction stage and the spent wash water from this washer is fed to the brown stock washer. Referring to FIG. 3, unbleached pulp from digester 210 is supplied through line 211 to brown stock washers 212 where it is washed. The washed pulp is passed from the washers 212 through line 213 to a first stage bleach tower 214. The at least partially bleached pulp is fed through line 215 to a washer 216 and thence through line 217 to a first stage extraction tower 218. The extracted pulp is next passed through line 219 to washer 220. The pulp is then passed through line 227 for further processing such as further bleaching by the system illustrated in FIG. 1.

Aqueous bleaching solution, which may be chlorine or chlorine dioxide and is preferably a mixture of chlorine and chlorine dioxide, is supplied to the bleach tower 214 through line 227. An aqueous solution of sodium hydroxide is fed to the extraction tower 218 through line 228.

The black liquor from the brown stock washers 212 is conducted through line 226 to the pulp mill chemical recovery system for recovery of chemical values therefrom.

Wash water, which may be fresh water, evaporator condensate, pulp drying machine white water, or spent wash water from a subsequent washing step is fed to washers 216 and 220 through lines 221 and 222 respectively. The wash water may be fed to each of the washers from independent sources or from a common source. The spent wash water from washers 216 and 220 is fed to the brown stock washers 212 through lines 223 and 224 respectively.

It will be understood that for the sake of simplicity repulpers, pumps and seal tanks that would be employed in the system shown in the figures have been omitted.

Washers 12, 15, 17, 19, 21, 23, 112, 118, 212, 216 and 220 may be of the type which employ a wire mesh on the periphery of a drum that dips into and rotates within a tank to which the pulp to be washed is supplied, the washing action being of a displacement type wherein the wash water is sprayed against the pulp web or mat that forms on the wire mesh and passes through the mat and mesh displacing the liquid in the mat.

The unbleached pulp is formed in digester 10 (FIG. 1), 110 (FIG. 2) or 210 (FIG. 3) from wood or other cellulosic material, generally wood chips by digestion with a suitable liquor, generally an aqueous solution of sodium hydroxide and/or sodium sulphide or, in sulphite processes, an aqueous solution containing sodium sulfite or sodium bisulfite, or mixtures of sodium sulfite and sodium bisulfite or of sodium bisulfite and sulphurous acid.

In order to prevent what would otherwise be a rapid build up of chloride in the pulp mill chemical recovery system (assuming that the fume in the flue gas from the recovery furnace were treated conventionally by being scrubbed out with water or precipitated dry with an electrostatic precipitator and the recovered solids recycled), it is necessary to remove sodium chloride introduced into the chemical recovery system via line 30 (FIG. 1), line 122 (FIG. 2) or line 226 (FIG. 3) and in other ways from the system. This may be done, for example, by separating the sodium chloride from the solids recovered from the fume and then returning the remaining solids to the system. One method by which this separation may be carried out is outlined in British patent application Ser. No. 49,698/65, filed Nov. 23, 1965 for Recovery of Sodium Chloride in the Production of Bleached Pulp, the disclosure of which is incorporated herein by reference. As set out in this application, the collected fume may be slurried in cold water or in a solution containing sodium sulphate to produce a slurry having a high solids content, say 66%. Sodium chloride will dissolve preferentially to sodium sulphate in such a slurry, and the undissolved solids can be separated by filtration or by means of a centrifuge. The sodium chloride solution may be treated to recover sodium and chlorine values therefrom, it may be supplied to a chlorine dioxide generator used to furnish chlorine dioxide for bleaching, or it may be electrolysed in the manufacture of sodium chlorate or of sodium hydroxide and chlorine. The undissolved solids may be returned to the system and recycled.

While it is not essential to this invention, it is desirable that chlorine dioxide be substituted for a substantial part or all of the chlorine in the first bleaching stage, and that chlorine dioxide be employed in the two subsequent bleaching stages, since this will diminish the carry-over of chloride into the chemical recovery system in view of the fact that chlorine dioxide contains only one fifth as much chlorine per oxidizing equavalent as does elemental chlorine. This substitution has been shown to have additional benefits in diminishing the total available chlorine required to reach the same brightness in the bleaching system with a particular unbleached pulp, in diminishing substantially the amount of alkali required in the subsequent alkaline extraction stage due to the decreased amount of hydrochloric acid produced in the chlorination stage and the decreased amount of chlorine introduced into the lignin residues, in improving the strength properties of the pulp significantly, and in eliminating the toxicity toward fish normally found in chlorination effluents. The use of both chlorine and chlorine dioxide in the chlorination stage of a bleaching system is set out in greater detail in British Pat. No. 1,007,697 the disclosure of which is incorporated herein by reference.

A sequential addition of substantially chlorine dioxide followed shortly after by an addition of substantially chlorine in the first bleaching stage may also be used, as disclosed in a paper entitled "Lower Cost Pulp Bleaching With Chlorine Dioxide as a First Treatment" by W. Q. Jack and L. B. Feller, presented at the 53rd annual meeting of the technical section of the Canadian Pulp and Paper Association at Montreal, Canada, Jan. 24, to 27, 1967.

It is desirable, although not essential, that the alkali used in the two alkaline extraction stages be sufficient to neutralize all the hydrochloric and other acids in the bleaching liquors, so that the wash water used to wash the unbleached pulp in the brown stock washers 12 (FIG. 1), 112 (FIG. 2) and 212 (FIG. 3) will be netural or alkaline. This will materially reduce atmospheric pollution resulting from the evolution of hydrogen sulphide in the chemical recovery system as compared to a system in which the wash water in line 31 is acidic.

In a conventional pulp mill, unless additional evaporating capacity is provided, the amount of water available for pulp washing if the mill is converted to practise this invention is approximately equal to the amount currently being evaporated. This amounts to about 8–10 pounds of water per pound of pulp. This amount of water can be used for washing the pulp in the last stages of bleaching, and about half of this water can be removed via line 37 for the purpose hereinbefore described.

It will be appreciated that with the counter-current type washing system used in the practise of this invention, for economic reasons, care must be taken to avoid excessive use or wastage of bleaching chemicals. For example, any carry-over of sulphide ion from the digester into the first or subsequent bleaching stages will cause substantial amounts of oxidizing agent to be consumed, although pulp quality will not be impaired. Therefore, thorough washing of the pulp to minimize carry-over of reducing substances such as lignin and sulphide ion into any oxidizing stage is highly desirable.

It should be appreciated that in one of its simplest forms the present invention requires using some or all of the water which has been employed to wash the partially bleached pulp subsequent to the first stage bleach to wash the unbleached pulp, some, and preferably all of the water used to wash the unbleached pulp then being returned to the pulp mill chemical recovery system.

In a modification of the process some or all of the water employed to wash the pulp after the first caustic extraction stage can be used to wash the unbleached pulp, some, and preferably all of the water used to wash the unbleached pulp then being returned to the system. Thus, with reference to FIG. 1 of the drawings, washer 15 could be eliminated and lines 31 and 32 connected to provide a system such as is illustrated in FIG. 2. Partially bleached pulp from tower 14 would pass directly into caustic extraction tower 16 without an intervening wash, and the water used in washer 17 would be passed via lines 32 and 31 directly to brown stock washers 12.

It should be noted that it is preferred to wash the pulp after the first bleaching stage and before the first caustic extraction stage because, as compared with the process described in the preceding paragraph, washing after bleaching and before caustic extraction will give greater removal of impurities from the pulp and will leave the sodium hydroxide at a higher concentration in the first caustic extraction stage, which should improve the effect on removal of colour-forming substances from the pulp.

A process embodying this invention also can be employed with other bleaching systems such as CEH (H=hypochlorite) or CEHDED, for example.

It will be apparent from the foregoing that by the practise of this invention bleached pulps can be produced without the necessity of discharging any liquid effluent from the bleach plant into a body of water. It also should be realized that the practise of this invention makes it no longer necessary to locate pulp mills adjacent to large bodies of water which can be used as sewers. Thus, provided that sufficient ground or surface water were available at any given inland location for use in the various processes carried out in the pulp mill, it would be entirely feasible to locate the pulp mill at such an inland location.

I claim:

1. A process for the formation of bleached wood pulp consisting of the steps of: digesting wood in a pulping liquor to provide a wood pulp, contacting said wood pulp with a first wash water to provide a washed pulp and a black liquor containing spent pulping liquor and wash water, contacting said washed pulp with a bleaching agent in a first bleaching step to provide an at least partially bleached pulp, contacting said at least partially bleached pulp with a second wash water in a second washing step to provide a washed and at least partially bleached pulp and a first spent wash water, contacting said washed and at least partially bleached pulp with an aqueous caustic alkali solution to provide an extracted pulp, contacting said extracted pulp with a third wash water in a third washing step to provide an extracted and washed pulp and a second spent wash water, concentrating said black liquor, subjecting said liquor to reducing conditions to recover materials convertible into or reusable as pulping chemicals, utilizing at least part of said second spent wash water as said second wash water and utilizing at least part of said first spent wash water as said first wash water.

2. A process for the formation of bleached wood pulp consisting of the steps of: digesting wood in a pulping liquor to provide a wood pulp, contacting said wood pulp with a first wash water to provide a washed pulp and a black liquor containing spent pulping liquor and wash water, contacting said washed pulp with a bleaching agent in a first bleaching step to provide a first at least partially bleached pulp, contacting said at least partially bleached pulp with a second wash water in a second washing step to provide a first washed and at least partially bleached pulp and a first spent wash water, contacting said first washed and at least partially bleached pulp with an aqueous caustic alkali solution to provide a first extracted pulp, contacting said first extracted pulp with a third wash water in a third washing step to provide a first extracted and washed pulp and a second spent wash water, contacting said first extracted and washed pulp with a bleaching agent in a second bleaching step to provide a second at least partially bleached pulp, contacting said second at least partially bleached pulp with a fourth wash water in a fourth washing step to provide a second washed and at least partially bleached pulp and a third spent wash water, contacting said second washed and at least partially bleached pulp with an aqueous alkali solution to provide a second extracted pulp, contacting said second extracted pulp with a fifth wash water in a fifth washing step to provide a second extracted and washed pulp and a fourth spent wash water, contacting said second extracted and washed pulp with a bleaching agent in a third bleaching step to provide a bleached pulp, contacting said bleached pulp with a sixth wash water in a sixth washing step to provide a bleached and washed pulp and a fifth spent wash water, concentrating said black liquor, subjecting said black liquor to reducing conditions to recover materials convertible into or reusable as pulping chemicals, utilizing said fifth spent wash water as said fifth wash water, utilizing said fourth spent wash water as said fourth wash water, utilizing said third spent wash water as said third wash water, utilizing said second spent wash water as said second wash water, and utilizing first spent wash water as said first wash water, thereby providing counter-current flow of pulp and wash water.

3. In a kraft mill operation, the steps of: digesting wood in a pulping liquor including sodium hydroxide and sodium sulfide to provide a pulp and black liquor, washing said wood pulp free from said black liquor with a first wash water to provide a washed pulp and a waste liquor containing said black liquor and said first wash water, concentrating and smelting said waste liquor to provide a smelt containing sodium sulfide and sodium carbonate, dissolving said smelt in water, causticizing the solution of smelt to regenerate said pulping liquor, subjecting said washed pulp to chlorination with a bleaching agent comprising chlorine or a mixture of chlorine dioxide and chlorine to provide a first at least partially bleached pulp, contacting said at least partially bleached pulp with a second wash water in a second washing step to provide a first washed and at least partially bleached pulp and a first spent wash water, forwarding said first spent wash water to said first washing step as said first wash water; contacting said first washed and at least partially bleached pulp with an aqueous caustic alkali solution to provide a first extracted pulp; contacting said first extracted pulp with a third wash water in a third washing step to provide a first extracted and washed pulp and a second spent wash water; forwarding said second spent wash water to said second washing step as said second wash water, contacting said first extracted and washed pulp with a bleaching agent comprising chlorine dioxide in a second bleaching step to provide a second at least partially bleached pulp; contacting said second at least partially bleached pulp with a fourth wash water in a fourth washing step to provide a second washed and at least partially bleached pulp and a third spent wash water; forwarding said third spent wash water to said third washing step as said third wash water; contacting said second washed and at least partially bleached pulp with a aqueous alakli solution to provide a second extracted pulp; contacting said second extracted pulp with a fifth wash water in a fifth washing step to provide a second extracted and washed pulp and a fourth spent wash water; forwarding said fourth spent wash water to said fourth washing step as said fourth wash water; contacting said second extracted and washed pulp with a bleaching agent comprising chlorine dioxide to provide a bleached pulp; contacting said bleached pulp with a sixth wash water in a sixth washing step to provide a bleached and washed pulp and a fifth spent wash water; and forwarding said fifth spent wash water to said fifth washing step as said fifth wash water; whereby countercurrent flow of pulp and wash water is achieved and all of the spent wash water is forwarded to the kraft mill recovery steps with said black liquor.

References Cited
UNITED STATES PATENTS

| | | | |
|---|---|---|---|
| 1,683,262 | 9/1928 | Richter et al. | 162—60 |
| 2,295,215 | 9/1942 | Joachim | 162—89 |
| 2,962,413 | 11/1960 | Hatheway | 162—89 |
| 3,366,535 | 1/1968 | Cann | 162—30 |
| 3,453,174 | 7/1969 | Rapson | 162—30 |

S. LEON BASHORE, Primary Examiner

A. L. CORBIN, Assistant Examiner

U.S. Cl. X.R.

162—30, 82, 89